UNITED STATES PATENT OFFICE.

ALBERT THEODORE KING, OF WIMBLEDON, AND FREDERICK ALFRED MASON, OF LONDON, ENGLAND.

MANUFACTURE OF ACETALS.

1,312,186.      Specification of Letters Patent.      Patented Aug. 5, 1919.

No Drawing.      Application filed January 2, 1917. Serial No. 140,285.

*To all whom it may concern:*

Be it known that we, ALBERT THEODORE KING, B. Sc., F. I. C., and FREDERICK ALFRED MASON, B. A., Ph. D., both subjects of the King of Great Britain, and residents of 39 Kenilworth avenue, Wimbledon, England, and 21 Queen Square, London, W. C., England, lecturer in chemistry and research chemist, respectively, have invented new and useful Improvements in the Manufacture of Acetals, of which the following is a specification.

Acetals of the type:—$CH_3CH(OR)_2$, where R is any alkyl radical, are of considerable technical importance in reactions where it is desired to obtain products directly related to the mother substance acetaldyhyde $CH_3CHO$.

At present the only practicable process for making the substances from acetaldehyde and an alcohol is that due to Fischer & Giebe, (*Berichte* 30, p. 3053, and 31, p. 545).

According to this method aldehyde and excess of alcohol are caused to condense under the action of hydrochloric acid:

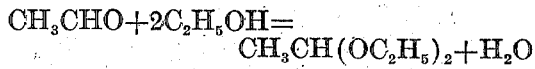

yielding in the above case ordinary acetal.

This method with the most careful working is stated, however, to give a yield of only 50% of the theoretical.

In fact it is expressly stated in the literature (*cf.* Meyer & Jacobson, *Organischen Chemie*, 2nd ed., vol. 1, part 2, p. 63) that a quantitative yield cannot be obtained as the process is reversible.

The present invention allows acetals to be prepared from a fatty alcohol and acetaldehyde in excellent yields (approximating to the theoretical in the case of ordinary acetal).

The method consists in treating a mixture of an alcohol, for instance ethyl alcohol, and acetaldehyde, containing preferably from 20% to 50% of acetaldehyde with condensing agents capable of effecting simultaneously the condensation of the alcohol and the aldehyde, and the separation therefrom of the acetal as an upper layer, examples of such condensing agents being the hydrated or dehydrated chlorids, bromids, or nitrates of aluminium, beryllium, calcium, cerium, lithium, magnesium, manganese, or thorium or the crude nitrates, bromids, or chlorids of the rare-earth residues containing cerium or thorium, or saturated solutions of any of these or mixtures of any or all of the same, with or without the addition of a little hydrochloric or other acid such as nitric, sulfuric, oxalic, acetic, or the like.

By these means the alcohol and acetaldehyde are caused to condense together and the resultant acetal to separate out from the reaction mixture in an approximately pure form as an upper layer which can be readily removed and purified in a suitable manner.

In a similar way other analogous derivatives of acetaldehyde may be prepared by treating a mixture of one molecular proportion of acetaldehyde and about two molecular proportions of other aliphatic alcohols as above described, but the yields in these cases are not usually so good as in the case of diethyl acetal.

Further we have found that where hydrochloric acid is used it may, if desired, be produced *in situ* by the interaction of another acid such as sulfuric acid or acetic acid or the like with the metallic chlorids, or the hydrochloric acid may be replaced wholly or in part by any other suitable acid such as nitric, sulfuric, oxalic, acetic, or the like, or the chlorids or nitrates themselves may be produced *in situ*.

As a general rule the order of mixing aldehyde, alcohol, acid and the metallic chlorid, bromid, or nitrate is immaterial, thus the alcohol-aldehyde mixture may be treated with a small proportion of acid to initiate the condensation, and the metallic salt may be added subsequently to complete the reaction and cause the separation of the acetal as an upper layer.

An exception to this rule occurs when the acid is first added to the acetaldehyde itself, in which case paraldehyde is first formed and the whole requires to be heated to reconvert to aldehyde.

Conversely paraldehyde may, of course, be employed as the source of the acetaldehyde by heating the mixture to a conveniently elevated temperature, preferably in a closed vessel the acetaldehyde thus being produced *in situ*.

In all cases the time necessary for the reaction to be completed is materially shortened by working at a moderately elevated temperature.

The carrying out of the process is illustrated by the following examples:—

Example I.

50 grams of acetaldehyde and 120 grams of 95% alcohol are mixed and then 20 grams anhydrous calcium chlorid added. The mixture becomes warm and is allowed to stand for some time with occasional shaking. It has then separated into two layers, the upper of which is removed, washed with water, then with sodium carbonate solution, dried over calcium chlorid and finally over anhydrous potassium carbonate. On fractionation it yields 35 grams boiling from 78° to 100° and 98 grams boiling at 100°–103° C. The first fraction on redistilling yields 22 grams more acetal, or 120 grams in all, or 90% of theory.

Example II.

A mixture of 150 grams normal butyl alcohol and 50 grams acetaldehyde is treated with 25 grams calcium nitrate and a few drops of dilute nitric acid.

It is then shaken for some time and allowed to stand. An upper layer separates consisting chiefly of di-butyl acetal,

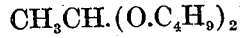

$$CH_3CH.(O.C_4H_9)_2$$

which, after suitable purification boils at 198°–200° C.

Example III.

A mixture of 150 grams isopropyl alcohol and 50 grams acetaldehyde is treated with 50 grams anhydrous calcium chlorid added by degrees, with shaking, and then a few drops of hydrochloric acid. After standing, the upper layer of di-isopropyl acetal, $CH_3CH(OC_3H_7)_2$ is separated, cleared with potassium carbonate and distilled. Boiling point 134°–136° (uncorrected).

We do not confine ourselves to the particulars given in the above examples which are merely typical and can be varied within wide limits without altering thereby the nature of the invention.

What we claim and desire to secure by Letters Patent of the United States is:—

1. In the manufacture of acetals derived from acetaldehyde and an aliphatic alcohol, the process which consists in treating a mixture of acetaldehyde and an aliphatic alcohol with a condensing agent capable of effecting simultaneously the condensation of the alcohol and aldehyde and the separation therefrom of the acetal, the acetal being separated from the mixture as an upper layer which can be removed in a substantially pure condition.

2. In the manufacture of acetals derived from acetaldehyde and an aliphatic alcohol, the process which consists in treating a mixture of acetaldehyde and an aliphatic alcohol with a small quantity of a strong acid, to initiate the condensation and then treating the product with a condensing agent capable of effecting simultaneously the complete condensation of the alcohol and aldehyde and the separation therefrom of the acetal, the acetal being separated from the mixture as an upper layer which can be removed in a substantially pure condition.

3. In the manufacture of acetals derived from acetaldehyde and an aliphatic alcohol, the process which consists in treating a mixture of paraldehyde and an aliphatic alcohol with a condensing agent capable of effecting simultaneously the condensation of the alcohol and the paraldehyde and separation therefrom of the acetal, the acetal being separated from the mixture as an upper layer which can be removed in a substantially pure condition.

4. In the manufacture of acetals derived from acetaldehyde and an aliphatic alcohol, the process which consists in treating a mixture of paraldehyde and an aliphatic alcohol with a small quantity of a strong acid to initiate the condensation and then treating the product with a condensing agent capable of effecting simultaneously the complete condensation of the alcohol and paraldehyde and the separation therefrom of the acetal, the acetal being separated from the mixture as an upper layer which can be removed in a substantially pure condition.

In testimony whereof we have signed our names to this specification in the presence of two subscribing witnesses.

ALBERT THEODORE KING.
FREDERICK ALFRED MASON.

Witnesses:
ALFRED O. BISHOP,
O. J. WORTH.